United States Patent [19]

Shaw et al.

[11] Patent Number: 4,990,587
[45] Date of Patent: Feb. 5, 1991

[54] METHOD OF PREPARING TOUGHENED EPOXY POLYMERS

[75] Inventors: Steven J. Shaw, Saffron Walden; David A. Tod, Ware, both of England

[73] Assignee: Secretary of State for Defence in Her Britannic Majesty's Government of the United Kingdom and Northern Ireland, Whitehall, England

[21] Appl. No.: 457,688

[22] PCT Filed: Jun. 22, 1988

[86] PCT No.: PCT/GB88/00477

§ 371 Date: Jan. 4, 1990

§ 102(e) Date: Jan. 4, 1990

[87] PCT Pub. No.: WO88/10276

PCT Pub. Date: Dec. 29, 1988

[30] Foreign Application Priority Data

Jun. 26, 1987 [GB] United Kingdom ............... 8714978

[51] Int. Cl.$^5$ .................... C08L 63/00; C08L 63/10
[52] U.S. Cl. ................................. 528/113; 528/361; 528/365; 525/113
[58] Field of Search .................. 528/113, 361, 365; 525/113

[56] References Cited

U.S. PATENT DOCUMENTS

| | | | |
|---|---|---|---|
| 3,673,274 | 6/1972 | Tomalia et al. | 528/113 X |
| 4,025,578 | 5/1977 | Siebert | 528/113 |
| 4,119,592 | 10/1978 | Murphy | 528/94 X |
| 4,476,285 | 10/1984 | Crabtree et al. | 525/113 |

OTHER PUBLICATIONS

Pavlikova et al., "Modification of Epoxy Resins by Carboxyl-Terminated Liquid Rubbers", Int. Polymer Science and Technology 1, No. 11 (1980).

Manzione et al., "Rubber-Modified Epoxies", Journal of Applied Polymer Science 26, 889–905 (1981).

*Primary Examiner*—Earl Nielsen
*Attorney, Agent, or Firm*—Nixon & Vanderhye

[57] ABSTRACT

Toughened epoxy resins are prepared by curing a mixture of epoxy resin, a liquid carboxyl-terminated elastomer, and, as curing agent, a non-aromatic heterocyclic amine or a salt thereof. Cure is in two stages, the first stage at a temperature of at least 135° C. for less than two hours to provide a partly cured formulation comprising phase-separated rubbery particles in an epoxy resin matrix, and a second stage of completing the cure.

13 Claims, No Drawings

METHOD OF PREPARING TOUGHENED EPOXY POLYMERS

This invention relates to a method of preparing toughened thermoset epoxy polymers from elastomer-containing epoxy resin formulations.

Epoxy resins are used extensively as matrix resins for fiberreinforced composite materials and as adhesives where advantage is taken of favourable properties such as high modulus, low creep and reasonable elevated temperature performance. However, characteristics such as these require a cured epoxy resin having a highly crosslinked structure which results in a tendency towards brittleness and poor resistance to crack growth.

Although a number of techniques have been developed to increase the toughness of cured epoxy resins (also referred to in this specification as epoxy polymers), probably the most successful has concerned the use of carboxyl-terminated butadiene acrylonitrile (CTBN) rubbers. The addition of such elastomers to uncured epoxy resins has produced cured rubber-modified epoxy resins exhibiting microstructures consisting of relatively small rubbery particles dispersed in, and bonded to, a matrix of crosslinked epoxy resin. Numerous studies have conclusively shown that such two-phase morphologies yield an epoxy polymer having a considerably higher toughness compared to the unmodified system with only minor reductions in other important properties such as modulus and glass transition temperature. Such attributes have resulted in rubber-modified epoxy resins being seriously considered for structural adhesive and composite matrix applications.

The properties of cured rubber-modified epoxy resins depend to a large degree on the factors controlling the critically important phase separation process. Of fundamental importance is the need to achieve an optimum compatability balance. Good initial compatability between the rubber and the uncured epoxy formulation together with a capacity for molecular incompatability at a later stage in the cure reaction, prior to gelation, are the essence of the technique.

Many factors have been shown to influence the phase separation characteristics of rubber-modified epoxy resin formulations and thus influence mechanical properties. Notable examples include the acrylonitrile content of the rubber modifier and the quantity and type of curing agent employed. The latter can influence the epoxy/rubber compatability balance as well as exert a degree of control over the rate of gelation and cure.

Cure conditions (temperature and time) are known to influence the mechanical properties of both unmodified cured epoxy resins and cured epoxy resins modified by the inclusion of elastomers. In particular Manzione et al (Journal of Applied Polymer science, Vol. 26, 889–905 (1981)) and Levita et al (Polymer (1985) 26 p1110–1116) have investigated the effect of cure conditions on epoxy resin formulations based on diglycidyl ether of bisphenol A and pieridine curing agent which are modified with, respectively, carboxyl-and amine-terminated butadiene-acrylonitrile liquid rubbers. Although not usually employed in commercial formulations, piperidine offers certain advantages in this type of formulation over other curing agents in that (i) a pre-reaction between the epoxy compound and the amine or carboxyl-terminated rubber are not required prior to cure, and (ii) it encourages the formation of a clearly defined two phase cured product, in which the amount of rubber remaining in the cured epoxy matrix phase surrounding the rubbery particles is minimised thereby preventing the formation of a product which is flexible.

Both groups of investigators reported optimum cure conditions of 120° C. for 14–16 hours to provide products of maximum toughness. However, such lengthy cure times are a clear disadvantage in the commercial use of adhesives where much shorter cure times are required to facilitate the speedy production of assembled structure. Levita et al, who used cure times in excess of 14 hours in all their reported work, found that for epoxy formations modified with ATBN (amine-terminated butadiene-acrylonitile rubber), toughness increased with cure temperature up to a cure temperature of 120° C, above which both toughness and glass transition temperature showed a marked decline up to a cure temperature of 160° C. Similarly Manzione et al found that epoxy resins cured from epoxy formulations containing 10 parts per hundred CTBN and 5 parts per hundred piperidine showed a well defined and large particulate rubber phase volume (and hence a high degree of toughness) when cured at 120° C. for 14 hours but a virtually non-existant rubber phase when cured at 150° C. for 4 hours.

The present inventors have now found that by employing epoxy resin formulations containing higher proportions of carboxyl-terminated liquid elastomer than that reported by Manzione et al, highly toughened cured epoxy resins can be prepared using significantly shorter cure times and higher curing temperatures than have hitherto been recommended. Surprisingly, the inventors have found that not only is a large improvement in toughness achieved, but also this improvement results in little or no decline in either glass transition temperature or modulus of elasticity in the cured product.

According to the present invention, there is provided a method of preparing a toughened epoxy polymer from an epoxy resin formulation, the formulation comprising a mixture of 100 parts by weight of an epoxy resin, from 12.5 to 25 parts by weight of a liquid carboxy terminated elastomer and from 0.5 to 15 parts by wight of a curing agent, said curing agent being selected from non-aromatic heterocyclic amines and salts thereof having selectivity for a carboxy-epoxide reaction, wherein the method comprises curing the formulation in two stages, the first stage comprising curing the formulation oat a temperature of at least 135° C. for less than 2 hours, preferably of from 135° C. to 200° C. for 0.5 to 1.5 hours, to provide a partly cured formulation comprising phase-separated rubbery particles in an epoxy resin matrix, and the second stage comprising curing the formulation for a further period until the epoxy resin matrix is cured. The total period of cure for both stages will generally be more than 2 hours for a second stage cure temperature of less than 170° C., more than 3 hours for a second stage cure temperature of less than 150° C., and more than 5 hours for a second stage cure temperature of less than 135° C.

The present method is found to result in rubbery particle-containing epoxy polymers having up to sevenfold increases in fracture energy $G_{IC}$ (a measure of toughness) by changing the cure conditions away from the hitherto recommended (and optimised) cure conditions of 120° C for 14–16 hours. Of particular importance is the fact that this improvement in toughness can be achieved using considerably shorter cure times and with a minimal reduction in flexural modulus (typically less than 3%) and virtually no reduction in glass transition temperature.

The present inventors have found that the key to the success of the method lies in the temperature of the formulation during the phase separation of the rubber particles (first stage). For maximum improvement in toughness this temperature is preferably from 140° C. to 190° C., more preferably from 145° C. to 180° C., most preferably 150° C. to 170° C. The time taken to effect complete phase separation is largely independent of temperature, because although increasing temperature increases the rate of reaction between the carboxy-terminated elastomer and epoxy resin, it also increases the compatibility between the two and so reduces the tendency for phase separation to occur. The first stage cure temperature is preferably limited to a maximum of 200° C. to prevent unacceptable loss of volatile curing agent.

The second stage of the reaction is less temperature dependent than the first, because it is used mainly to cure the epoxy resin matrix surrounding the rubbery particles. For a given cure temperature, all that is required to provide a cured matrix in an appropriate selection of cure times which will generally be shorter than the higher the second stage cure temperature selected. However, an upper limit of 200° C., preferably 190° C., most preferably 180° C., is desirable to minimize loss of volatile curing agent, and there is a clear advantage for industrial applications in selecting a temperature which will require a relatively short total cure time. For this reason the second stage cure temperature is preferably a minimum of 80° C., more preferably a minimum of 120° C. A second stage cure temperature of at least 135° C. will generally require a total cure time of less than 10 hours, which is shorter than the period recommended for the conventional cure of this type of resin formulation, and higher second stage cure temperatures will generally require even shorter total cure times. For ease of curing, it is clearly desirable to employ the same temperature during the first and second stages. An optimum range of cure conditions are 150° C. to 180° C. for 2 to 6 hours in which the cure temperature is the same during both cure stages.

The amount of liquid carboxy terminated elastomer present in the formulation is preferably from 12.5 to 20 parts by weight, most preferably from 13 to 17 parts by weight. The amount of curing agent in the formulations is preferably from 2 to 10 parts by weight, most preferably from 3 to 7 parts by weight.

The epoxy resin employed preferably has an average of about two

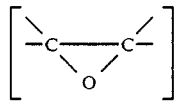

groups per molecule. However, because the epoxy resins are prepared by processes which do not yield perfectly all difunctional epoxy resins, the epoxy resins used will, as a practical matter, have an average number of epoxide groups per molecule of from slightly below to slightly above two epoxide groups per molecule. Hence, the epoxy resin employed will generally have an average of from 1.7 to 2.3 epoxide groups per molecule. An epoxy resin having substantially above or below this range of epoxide groups per molecule may not produce useful cured adhesives by the method of the present invention. Epoxy resins having below an average of 1.7 epoxide groups per molecule may not undergo sufficient chain-extension and/or crosslinking whereas epoxy resins having more than 2.3 epoxide groups may undergo excessive crosslinking. An epoxy resin having two epoxide groups per molecule, said epoxide groups located at the terminal ends of the molecule, is preferred.

The epoxy resins are generally liquids having a bulk viscosity (measured using a Brookfield LVT viscometer, spindle No. 7, at 0.5 to 100 rpm at 25° C.) of from about 200 centipoises to about 2,000,000 centipoises, and more preferredly from about 500 centipoises to about 500,000 centipoises. The epoxy resins can have epoxide equivalent weight from about 150 to 1000. More preferrably, the resins have epoxide equivalent weights of from about 160 to about 400. The epoxide equivalent weight is the weight of epoxy resins that contains one gram equivalent of epoxy groups. The epoxide equivalent weight can be determined by using the pyridium chloride-pyridine method of determining epoxy content.

Many types of epoxy resins can be used. Examples of types are the diglycidyl ethers of dihydric phenols, the diglycidyl ethers of dihydric aliphatic alcohols, the diglycidyl esters of dicarboxylic acids, the diglycidyl ethers of diamino compounds, and diepoxidized fatty acids. Examples of each of these types of epoxy resins are disclosed in U.S. Pat. Nos. 3,655,818 and 3,678,131.

The diglycidyl ethers of dihydric phenols and the diglycidyl ethers of dialiphatic alcohols are the more preferred epoxy resins. An example of the diglycidyl ethers of dihydric phenols are the Bisphenol A/epichlorohydrin type resins as the "Epon" resins marketed by Shell Chemicals. As mentioned above, although the epoxy resins can have an average epoxide content from 1.7 to 2.3 epoxide groups per molecule, the most preferred epoxy resins have an average of about 2 epoxide groups per molecule.

The liquid polymer employed is a carboxyl-terminated polymer preferably having an average of from about 1.6 to about 2.4 carboxyl (COOH) groups per molecule. Preferably, the polymer has two carboxyl groups, one located at each of the terminal ends of the polymer molecule. If the liquid polymer has terminal carboxyl groups, it can additionally have carboxyl groups located pendent to the polymer backbone. The carboxyl content of the polymers preferably ranges from about 0.5% to about 10% by weight based upon the weight of the polymer, more preferably, from about 1% to about 6% by weight. Carboxyl content can be determined by titration of a polymer solution to a phenolphthalein end point using alcoholic KOH.

The liquid polymers preferably have a molecular weight of from about 600 to 10,000 as measured using a Mecrolab Vapor Pressure Osmometer. The polymers are more conveniently described by their bulk viscosity. The liquid polymers preferably have a bulk viscosity of from about 500 centipoises to about 2,000,000 centipoises (measured at 27° C. using a Brookfield Model LVT viscometer with spindle No. 7 at 0.5 100 rpm). More preferably, the polymers have a bulk viscosity from about 5000 centipoises to about 1,000,000 centipoises. Polymers having a bulk viscosity from about 10,000 centipoises to about 600,000 centipoises are particularly useful.

The liquid carboxyl-terminated polymers have polymeric backbones comprising carbon-carbon linkages or carbon-oxygen linkages. The polymers, if cured using conventional liquid rubber cure systems, would be elastomers in a cured state. Polymers having carbon-carbon linkages are preferred. The polymeric backbone of these liquid carboxyl-terminated polymers may comprise polymerised units of one or more vinylidene monomers selected from (a) mono-olefins containing 2 to 14 carbon atoms such as ethylene, propylene, isobutylene, 1-butene, 1-pentene, 1-hexene, 1-dodecane, and the like; (b) dienes containing 4 to about 10 carbon atoms such as butadiene, isoprene, 2-isopropyl-1, 3-butadiene, chloroprene, and the like; (c) vinyl and allyl esters such as vinyl acetate, vinyl propionate; allyl acetate, and the like; (d) vinyl and allyl ethers such as vinyl methyl ether, allyl methyl ether, and the like; and (e) arylates of the formula

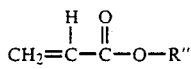

wherein R" in an alkyl radical containing 1 to about 18 carbon atoms or an alkoxyalkyl, and alkylthiolalkyl, or cyanolalkyl radical, each containing 2 to about 12 carbon atoms. Examples of such acrylates are ethyl acrylate, butyl acrylate, hexyl acrylate, 2-ethylhexyl acrylate, butoxyethyl acrylate, hexylthioethyl acrylate β-cyanoethyl acrylate, cyanooctyl acrylate, and the like. Often two or more types of these polymerized monomeric units are contained int he polymeric backbone. The vinylidene monomers listed above are readily polymerised in major amounts with up to 50% by weight (of total weight of the polymer) of (f) vinyl aromatics such as styrene, α-methyl styrene, vinyl toluene, and the like; (g) vinyl nitriles such as acrylonitrile, methacrylonityrile, and the like; (h) methacrylates and ethacrylates such as methyl methacrylate, ethyl methacrylate, octyl methacrylate, ethyl ethacrylate, and the like; and (i) divinyl and diacrylates such as divinyl benzene, divinyl ether, diethylene glycol diacrylate, and the like. Liquid polymer compositions containing liquid carboxyl-containing polymers comprised of over 50% to 100% by weight of interpolymerized units of a vinylidene monomer(s)listed in (a) to (e) with up to 50% by weight of interpolymerized units of a vinylidene monomer(s) listed in (f) to (i), are within the scope of this invention.

Examples of liquid carboxyl-terminated polymers are carboxyl-terminated polyethylene, carboxy-terminated polyisobutylene, carboxyl-terminated polybutadiene, carboxyl-terminated polyisoprene, carboxyl-terminated poly(butadiene-acrylonitrile), carboxyl-terminated poly(butadiene-styrene), carboxyl-terminated poly(ethyl acrylate), carboxyl-terminated poly(ethyl acrylate-n-butyl acrylate), carboxyl-terminated poly(n-butyl acrylate-acrylonitrile), carboxyl-terminated poly(butyl acrylate-styrene), and the like. These polymers can be prepared by free radical polymerization using carboxyl-containing initiators and/or modifiers as disclosed in U.S. Pat. No. 3,258,949 and German Pat. No. 1,150,205, and by solution polymerization using lithium metal or organometallic compounds and post-treating the polymers to form carboxy groups as disclosed in U.S. Pat. Nos. 3,135,716 and 3,431,235. The polymers can also be prepared be reacting liquid polymers having other than terminal carboxyl groups with compounds so as to yield carboxyl groups. For example, carboxyl-terminated polymers can be prepared from hydroxyl-terminated polymers by reaction with dicarboxyl compounds. Mercaptan-and amine-or amide-terminated polymers can be reacted with unsaturated carboxylic acids or anhydrides to yield carboxyl-terminated polymers. Halogen-terminated polymers can be reacted and unsaturated anhydrides in the presence of Lewis acids to yield carboxyl groups. Hence, it is seen that the methods of preparing the liquid carboxyl-terminal polymer is not critical to the invention, as long as the polymer has at lest terminal carboxy groups and a polymeric backbone consisting of carbon-carbon or carbon-oxygen linkages.

Carboxyl-terminated poly(butadiene-acrylonitrile) and carboxyl-terminated poly(butadiene-styrene) polymers were found to be especially useful. The polymers contain about 5% to about 40% by weight of acrylonitrile or styrene, about 0.5% to about 10% by weight of carboxyl, and about 50% to about 95% by weight of butadiene based upon the weight of the polymer.

Examples of non-aromatic heterocyclic amines having selectivity for carboxy-epoxide reactions which may be used as curing agents in the method of the present invention are morpholine, piperidine, piperazine, N-methylpiperidine, N-methylpiperazine, N,N'-dimethylpiperazine, N,(2-aminoethyl)piperazine, N,N'-bis-(3-aminopropyl)piperazine, and the like. Salts of these amines, such as amine-acid salts like N-methylpiperidine/HCl salt are also useful. The curing agent is preferably piperidine.

The invention will now be described by way of example only.

MATERIALS & GENERAL PROCEDURE

The epoxy resin employed in each example was a liquid diglycidyl ether of bisphenol A (DGEBA) having an epoxy equivalent weight of approximately 190 g $mol^{-1}$. The curing agent was piperidine. The rubber used was liquid carboxyl-terminated butadiene-acrylonitrile rubber (CTBN) having an acrylonitrile content of 17% and a molar mass of 3500 g $mol^{-1}$.

The epoxy formulations employed in each of the following Examples was as follows:

| DGEBA | 100 (phr)* |
|---|---|
| Piperidine | 5 (phr)* |
| CTBN | 15 (phr)* |

*phr = parts per hundred resin by weight

The rubber-modified formulation used in the methods of this invention was prepared by initially adding the required quantity of CTBN to the resin followed by hand-mixing for approximately 10 minutes. The resultant mixture was then raised to a temperature of 70° C. in a water bath and stirred for five minutes with an electric stirrer, followed by degassing in a vacuum oven at 60° C. After cooling to 30° C., the piperidine was added and the mixture gently stirred so as to minimise air entrapment. The mixture was then poured into a 6 mm thick casting mould, previously preheated to the required cure temperature, and cured for the appropriate time followed by slow cooling. All fracture and mechanical property studies were conducted on specimens obtained from cast sheets.

EXAMPLES 1 to 12

A total of twelve temperature/time conditions were investigated and are shown in Table 1 below:

TABLE 1

| Example | Temperature (°C.) | Time (hours) |
|---------|-------------------|--------------|
| *1      | 120               | 2            |
| *2      | 120               | 4            |
| *3      | 120               | 6            |
| *4      | 120               | 16           |
| 5       | 140               | 2            |
| 6       | 140               | 4            |
| 7       | 140               | 6            |
| 8       | 160               | 2            |
| 9       | 160               | 4            |
| 10      | 160               | 6            |
| 11      | 180               | 2            |
| 12      | 180               | 6            |

*Comparative Examples

The properties of the cured product of each Example were determined using the following techniques:

1. Mechanical Properties

The fracture behaviour of the cured epoxy formulations were studied using compact tension specimens having saw-cuts into one side machined from the 6 mm cast sheets. In each case a sharp pre-crack was introduced by carefully tapping a fresh razor blade into the base of the saw-cut, which caused a natural crack to grow for a short distance ahead of the blade. The specimens were then mounted in a mechanical testing machine and fractured at 20° C. at a constant cross-head displacement rate of 1 mm min$^{-1}$.

Values of stress intensity factor (fracture roughness), $K_{IC}$, were calculated from the expression, $$K_{IC} = \frac{P_c}{HW^{\frac{1}{2}}} \cdot Q$$

where $P_c$ = load at crack initiation, H = thickness of specimen, w = width of the specimen, and Q = geometry factor given by, $$Q = 29.6(a/w)^{1/2} - 185.5(a/w)^{3/2} + 655.7(a/w)^{5/2} - 1017(a/w)^{7/2} + 638.9(a/w)^{9/2}$$

where a = crack length.

The critical stress intensity factor, $K_{IC}$, values were converted to fracture energy, $G_{IC}$, values using the equation, $$G_{IC} = \frac{K_{IC}^2}{E}$$

where E is flexural modulus.

Flexural modulus measurements were obtained from flexible bending experiments conducted on rectangular bars according to ASTM D790-71 at 20° C. and 1 mm min$^{-1}$ cross head displacement.

Dynamic mechanical studies were conducted on both formulations using a Rheometrics mechanicl spectrometer. Rectangular specimens, measuring 85 × 10 × 6 mm, were mounted vertically in the spectrometer and clamped securely at both ends. The upper fixture was subjected to torsional sinusoidal oscillations at a frequency of 1 Hz actuated by a voltage signal from a generator. The resultant torque in the specimens was transmitted to the lower fixture which was locked in position and connected to a transducer system, which through a transfer function analyser provided values of storage shear modulus, G' and loss shear modulus, G". Values of the loss tangent, tanσ, were calculated from the equation $$\tan\sigma = \frac{G''}{G'}$$

Measurements were taken at approximately 5° C. intervals between −160° C. and 150° C. Specimens were allowed to reach equilibrium for five minutes at each test temperature with a heating rate between test temperatures of approximately 5° C. per minute.

Fractography

Fracture surfaces of cured epoxy formulations were studied using a Jeol T300 scanning electro microscope, at a beam current and accelerating voltage of approximately 175 mA and 20 kV respectively. Prior to examination, surfaces were coated with a thin evaporated layer of gold/palladium so as to enhance conductivity and prevent charging.

Transmission electro microscopy was conducted on rubber-modified epoxy fracture surfaces that had been treated with osmium tetroxide and microtomed at room temperature. Rubber phase volume fraction and particle size were determined from the transmission electron micrographs using the Schwartz-Saltykor method.

Some of the properties of the cured products of the 12 Examples listed above are summarised in Table 2 below:

TABLE 2

| Example | FRACTURE TOUGHNESS $K_{IC}$ (MNm$^{-\frac{3}{2}}$) | FRACTURE ENERGY $G_{IC}$ (kJm$^{-2}$) | FLEXURAL MODULUS OF ELASTICITY (GPa) |
|---------|-----|-------|------|
| 1       | 2.25 | 1.99  | 2.54 |
| 2       | 2.51 | 2.05  | 2.51 |
| 3       | 2.47 | 2.45  | 2.49 |
| 4       | 2.27 | 1.76  | 2.57 |
| 5       | 3.26 | 4.32  | 2.46 |
| 6       | 3.95 | 6.42  | 2.43 |
| 7       | 4.64 | 8.68  | 2.48 |
| 8       | 3.86 | 6.29  | 2.37 |
| 9       | 5.28 | 11.57 | 2.41 |
| 10      | 5.83 | 13.82 | 2.46 |
| 11      | 4.24 | 10.43 | —    |
| 12      | 4.19 | 10.30 | —    |

The glass transition temperature for the cured product of each example was found to be within the range 90–95° C.

We claim:

1. A method of preparing a toughened epoxy polymer from an epoxy resin formulation, said formulation comprising a mixture of 100 parts by weight of an epoxy resin, from 12.5 to 25 parts by weight of a liquid carboxyl-terminated elastomer and from 0.5 to 15 parts by weight of curing agent, said curing agent being selected from non-aromatic heterocyclic amines and salts thereof having selectivity for a carboxy-epoxide reaction, characterised in that the method comprises curing the formulation in two stages, the first stage comprising curing the formulation at a temperature of at lest 135° C. for less than 2 hours to provide a partly cured formulation comprising phase-separated rubbery particles in an epoxy resin matrix, and the second stage comprising curing the formulation for a further period until the epoxy resin matrix is cured.

2. A method according to claim 1 characterised in that the first stage comprises curing the formulation at a temperature of 135° C. to 200° C. for 0.5 to 1.5 hours.

3. A method according to claim 1 characterised in that the epoxy resin formulations contains from 12.5 to 20 parts by weight of the liquid carboxyl-terminated elastomer.

4. A method according to claim 1 characterised in that the epoxy resin formulation contains from 2 to 10 parts by weight of the curing agent.

5. A method according to claim 1 characterised in that the liquid carboxy-terminated elastomer is a carboxyl-terminated butadiene-acrylonitrile liquid elastomer.

6. A method according to claim 1 characterised in that the curing agent comprises piperidine.

7. A method according to claim 1 characterised in that the first stage comprises curing the epoxy resin formulation at a temperature of from 140° C. to 190° C.

8. A method according to claim 7 characterised in that the first stage comprises curing the epoxy resin formulation at a temperature of from 145° C. to 180° C.

9. A method according to claim 1 characterised in that the second stage comprises curing the epoxy resin formulation at a temperature of from 80° C. to 200° C.

10. A method according to claim 9 characterised in that the second stage comprises curing the epoxy resin formulation at a temperature of at least 135° C. for a period of time such that the total cure time of the first and second stages is less than 10 hours.

11. A method according to claim 10 characterised in that the curing temperature employed in the first and second stages are the same.

12. A toughened epoxy polymer prepared by the method according to claim 1.

13. A toughened epoxy polymer, prepared from an epoxy resin formulation comprising a mixture of 100 parts by weight of an epoxy resin, from 12.5 to 25 parts by weight of a liquid carboxy-terminated elastomer and from 0.5 to 12 parts by weight of a curing agent, said curing agent being selected from non-aromatic heterocyclic amines and salts thereof having selectivity for a carboxy-epoxide reaction, which polymer has a fracture energy at 20° C. of from about 4.32 to about 13.82 $kJm^{-2}$.

* * * * *